UNITED STATES PATENT OFFICE.

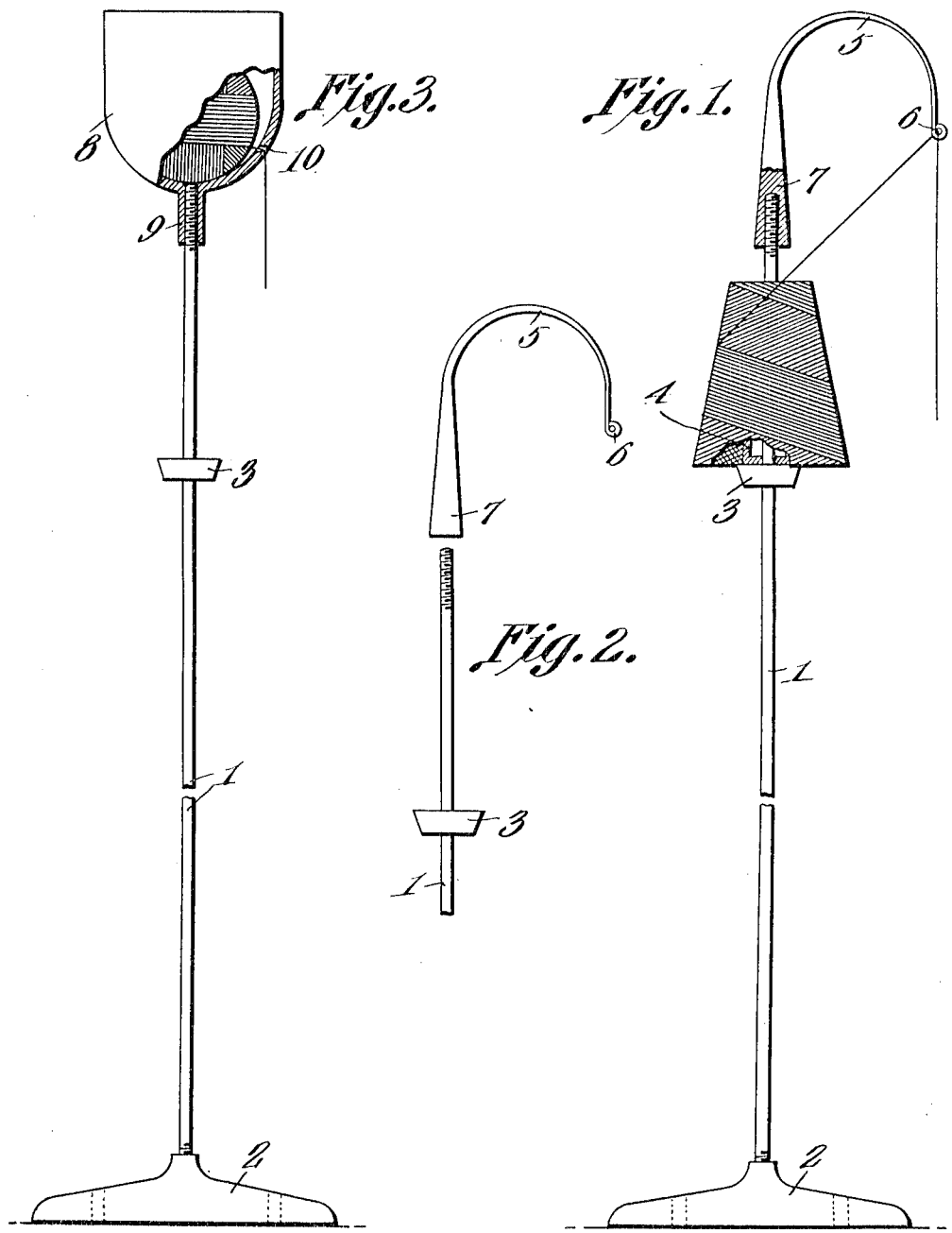

ROBERT S. DICKINS, OF WAYCROSS, GEORGIA.

TWINE-HOLDER.

1,090,033.  Specification of Letters Patent.  Patented Mar. 10, 1914.

Application filed April 12, 1912. Serial No. 690,339.

*To all whom it may concern:*

Be it known that I, ROBERT S. DICKINS, a citizen of the United States, residing at Waycross, in the county of Ware and State of Georgia, have invented a new and useful Twine-Holder, of which the following is a specification.

This invention relates to improvements in twine holders.

The invention has for its object to provide a device of this type, whereby facilities are afforded for readily accommodating the holding of wrapping twine either in the form of balls or cones of different sizes.

A further object of the present invention is to effect the suitable guiding or delivery of the twine from the holder conveniently to the user.

A still further object of the invention is to suitably lead the twine from the holder for facilitating the unwinding of the twine and relieving it of undue friction.

A still further object is to carry out the aforesaid ends in a simple, expeditious and effective manner.

The invention therefore consists of certain instrumentalities and features substantially as hereinafter fully disclosed and defined by the appended claims.

In the accompanying drawings, illustrating the preferred embodiment of my invention wherein it will be understood that various changes and modifications may be made as to the detailed construction and arrangement of the parts without departing from the spirit thereof, Figure 1 is a side elevation of my twine-holder. Fig. 2 is a detailed vertical section, partly in side view, of the same. Fig. 3 is a broken side elevation of the form of the device more especially for holding the twine in the form of balls.

In practising my invention, I provide a suitable standard or upright member 1 of metal and having a base or foot 2 having in practice, holes therethrough to receive fastenings for securing it to a counter or other point, and upon this standard is suitably secured or cast a shoulder 3, at a suitable point for supporting or upholding thereby a wrapping twine bobbin or holder 4 approximately in the form of a cone and which may be hollow and of card-board and which may turn or rotate upon the standard as the twine is unwound therefrom.

A twine guide-member or arm 5 of substantially the arcuate outline shown, has an eye 6 at its outer depending end to receive the twine 4 for suitably directing the passage of the wrapping twine from the cone or holder to the point whence it may be used. This guide or eye-ended arm 5 has a screw-threaded and socket connection 7, with the upper threaded end of the standard 4 whereby it may be readily detached therefrom when its use may not be required, as when it may be desired to use a twine holder of different type, an example of which will presently hereinafter be disclosed.

As shown in Fig. 3, the above shaped holder or cone 4 may be exchanged or substituted by a cup-shaped receptacle or holder 8 also adapted to have screw threaded and socket connection as at 9 with the upper screw threaded end of the standard 1, said receptacle or holder 8 having an aperture 10 therethrough, a short distance upwardly from, or in its bottom, for the passage of the twine therefrom in such manner as to prevent the casual displacement or bounding of the twine ball out of said holder, when drawn upon, as in effecting the unwinding of the twine. In this type or form of the twine-holder, the use of the arm 5 is omitted, the aperture or passage in said receptacle rendering the use of said arm unnecessary in connection therewith.

What is claimed is:—

1. An article of manufacture comprising a base, a standard, an outstanding collar carried by the standard intermediate its ends and defining a shoulder adapted to receive and support a twine spool, and a curved arm provided with a terminal eye detachably engaging the upper extremity of said standard and forming a shoulder therewith at the juncture between the said standard and arm, the last mentioned shoulder holding the twine spool in place upon the standard, the said eye adapted to guide the twine for the paying out thereof, the said shoulders allowing the said article to be supported in an upright or depending position.

2. An article of manufacture comprising a base, a standard secured thereto, a collar carried by said standard, said standard rotatably receiving a twine cone thereon, a curved eye-ended arm provided with an aperture extending therein and internally threaded, the upper extremity of said standard externally threaded and adapted to be engaged by the internal threads of the said curved arm, the said curved arm defining with the standard a second shoulder, the two shoulders adapted to rotatably receive a twine cone therebetween and to hold the same against longitudinal shifting, allowing the said article to be placed in an upright or depending position, the terminal eye of the arm adapted to guide the twine from the twine cone for the paying out thereof.

In testimony that I claim the foregoing as my own, I have hereto affixed my signature in the presence of two witnesses.

ROBERT S. DICKINS.

Witnesses:
J. S. ELKINS,
J. F. WILSON.